US012584534B2

(12) United States Patent (10) Patent No.: US 12,584,534 B2
Ankargren et al. (45) Date of Patent: Mar. 24, 2026

(54) SYSTEM AND METHOD FOR IMPROVED HEAVE COMPENSATION

(71) Applicant: Grant Prideco, Inc., Houston, TX (US)

(72) Inventors: David Bengt Johan Ankargren, Uppsala (SE); Peter Gu, Kristiansand S (NO)

(73) Assignee: Grant Prideco, Inc., Houston, TX (US)

( * ) Notice: Subject to any disclaimer, the term of this patent is extended or adjusted under 35 U.S.C. 154(b) by 123 days.

(21) Appl. No.: 16/837,272

(22) Filed: Apr. 1, 2020

(65) Prior Publication Data

US 2020/0318708 A1 Oct. 8, 2020

(30) Foreign Application Priority Data

Apr. 2, 2019 (EP) ..................................... 19166745

(51) Int. Cl.
*F16F 9/53* (2006.01)
*E21B 19/00* (2006.01)
*F16F 9/19* (2006.01)

(52) U.S. Cl.
CPC ............ *F16F 9/537* (2013.01); *E21B 19/006* (2013.01); *F16F 9/19* (2013.01); *F16F 2224/045* (2013.01)

(58) Field of Classification Search
CPC ............................. F16F 9/537; F16F 2224/045
See application file for complete search history.

(56) References Cited

U.S. PATENT DOCUMENTS

| | | | | |
|---|---|---|---|---|
| 5,149,131 A * | 9/1992 | Sugasawa | .......... | B60G 17/0162 |
| | | | | 280/5.515 |
| 5,947,240 A * | 9/1999 | Davis | ...................... | F16F 15/02 |
| | | | | 267/221 |
| 6,740,125 B2 | 5/2004 | Mosler | | |
| 2004/0173422 A1 * | 9/2004 | Deshmukh | .............. | F16F 9/006 |
| | | | | 188/267.2 |
| 2012/0181084 A1 * | 7/2012 | Pilgrim | ................... | E21B 19/16 |
| | | | | 175/57 |

(Continued)

FOREIGN PATENT DOCUMENTS

| | | | | | |
|---|---|---|---|---|---|
| CA | 2284282 A1 | * | 10/1998 | | |
| CN | 203051609 U | * | 7/2013 | | |
| CN | 104963985 A | * | 10/2015 | ................ | F16F 9/32 |

(Continued)

OTHER PUBLICATIONS

European Search Report for EP Application No. 19166745 dated Sep. 12, 2019 (6 Pages).

*Primary Examiner* — Melody M Burch

(74) *Attorney, Agent, or Firm* — Conley Rose, P.C.

(57) ABSTRACT

A damping system for a heave compensator for an off-shore oil rig includes a hydraulic cylinder having a piston and a housing. The hydraulic cylinder is configured for accepting a hydraulic fluid. There is a flow passage for restricting the flow of the hydraulic fluid during movement of the piston in the housing. The hydraulic fluid is a magnetic fluid and the damping system includes a magnetic fluid management system for controlling a magnetic field at the flow passage. A heave compensator including such a damping system, and a method for controlling the damping of a heave compensator are also disclosed, the method including subjecting a magnetic fluid to a magnetic field at a flow passage for restricting the flow of the magnetic fluid.

5 Claims, 8 Drawing Sheets

(56)               References Cited

U.S. PATENT DOCUMENTS

2016/0010717 A1 *   1/2016   Tosovsky ................ F16F 9/537
                                                                   188/267.2
2018/0306267 A1    10/2018   Yonehara

FOREIGN PATENT DOCUMENTS

| CN | 105366006 A | | 3/2016 | |
| CN | 106286685 B | * | 2/2018 | ............. F16F 9/535 |
| CN | 106641062 B | * | 12/2018 | |
| GB | 2503062 | | 12/2013 | |
| WO | WO-2015047232 A1 | * | 4/2015 | ............. E21B 34/06 |
| WO | 2016089217 A1 | | 6/2016 | |

* cited by examiner

100

SYSTEM AND METHOD FOR IMPROVED HEAVE COMPENSATION

CROSS REFERENCE TO RELATED APPLICATIONS

This application claims the benefit of European Patent Application, No. 19166745.0 filed Apr. 2, 2019 and entitled "System and Method for Improved Heave Compensation", which is incorporated herein by reference in its entirety for all purposes.

STATEMENT REGARDING FEDERALLY SPONSORED RESEARCH OR DEVELOPMENT

Not Applicable

FIELD OF THE DISCLOSURE

The invention relates to a damping system for a heave compensator for an off-shore oil rig. The invention also relates to a heave compensator comprising the damping system, and to a method for controlling the damping of a heave compensator.

BACKGROUND OF THE DISCLOSURE

The oil industry is experiencing increasing requirements for high-performance drilling equipment to maximize cost-efficiency following the market downturn that started in 2014. One way to improve cost-efficiency is to stretch the operating windows of the rig in terms of rig heave motion and load capacities to make the rig operable in rougher sea. This has incentivized drilling equipment manufacturers to develop more compact and robust solutions for these demands, without compromising safety.

A heave compensator for drilling and well intervention is typically a massive hydraulic-pneumatic suspension system with similar demands for controlling its suspension characteristics as smaller suspension and shock absorber systems. However, in addition, a drilling and well intervention heave compensator may face conditions outside of mere vibration damping (e.g. weight-on-bit and lift-off control), for example burst of released kinetic energy in sudden loss of load. Known prior art heave compensators are not able to handle these additional problems in a satisfactory manner.

SUMMARY OF THE DISCLOSURE

The disclosure offers an attempt to remedy or to reduce at least one of the drawbacks of the prior art, or at least provide a useful alternative to prior art, through features, apparatus and methods which are specified in the description below and in the claims that follow.

In a first aspect, this disclosure relates more particularly to a damping system for a heave compensator for an off-shore oil rig, the damping system comprising: a hydraulic cylinder having a piston and a housing, the hydraulic cylinder being configured for accepting a hydraulic fluid; and a flow passage for restricting the flow of the hydraulic fluid during movement of the piston rod in the housing, wherein the hydraulic fluid is a magnetic fluid and the damping system comprises a magnet and a magnetic fluid management system for controlling a magnetic field at the flow passage.

The term "magnetic fluid" is used to denote a liquid which changes its viscosity when subjected to a magnetic field, for example magnetorheological fluids and ferrofluid. A magnetic fluid comprises magnetic particles dispersed in a carrier fluid, whereby its viscosity can change when subjected to a magnetic field by the magnet, which is typically an electromagnet. The term "viscosity" is meant to include an apparent viscosity influenced by magnetic field.

The term "hydraulic cylinder" is used to denote a mechanical actuator comprising a cylinder housing and a piston, e.g. a plunger or a differential cylinder. The piston typically comprises a piston rod, however, it may also be a floating piston. It should not be understood as limiting the shape of the hydraulic cylinder in any way to be cylindrical. The cylinder housing and piston ends are attached to, or at least able to transfer force to, for example in the case of a floating piston, separate structures which need vibration damping in relation to each other, for example an oil rig and a drill string. The vibrational motion of the separate structures causes the piston to move relative to the cylinder housing. This motion forces the magnetic fluid to flow through the flow passage, thereby generating viscous damping as the flow through the flow passage is restricted. The extent to which the flow through the flow passage is restricted, and thereby the degree of damping of the system, depends on the viscosity of the fluid. Therefore, as the viscosity of the magnetic fluid at the flow passage can be controlled by the magnetic field at the flow passage, the degree of damping of the system is directly controlled by said magnetic field.

This control of viscosity of the magnetic fluid can supplement, and in some cases replace, traditional methods of flow control such as the use of flow throttling or pressure regulation valves. The major advantage of the magnetic fluid damping system is the low power that is required to control the viscosity of the magnetic fluid, as well as the compact and simple apparatus which is required compared with prior art active control systems. Such prior art active control systems may include complex and expensive valves, or even separate active circuits with their own hydraulic power unit.

The magnetic fluid damping system will for offshore drilling and well intervention heave compensators have additional functionality and advantages which go beyond the scope of its known and singular purpose as a vibration damper in e.g. the vehicle industry. In this disclosure, the magnetic fluid damping system can take an active role in heave compensation, uncontrolled loss-of-load protection, end-stop damping, energy harvesting, load lift-off control, as well as its conventional vibration damping duty. This disclosure, therefore, encompasses several technical fields of which the combination is innovative and its utility and value creation unique.

The damping system may comprise a gas chamber with variable volume filled with a compressible gas which functions as a spring, as is known from pneumatic-hydraulic suspension systems. The gas chamber also functions to change its volume when the amount of hydraulic fluid in the hydraulic cylinder changes. Additionally, if the hydraulic fluid is constrained within a closed cylinder, a gas chamber of variable volume may be needed to compensate for the change in volume available to the fluid when the piston rod moves in the housing, since the rod itself occupies a volume. Therefore, when the rod is deeper within the cylinder housing, less volume is available to the fluid, whereby the volume of the gas chamber will be decreased.

In one exemplary embodiment, the hydraulic cylinder housing may comprise a magnet, for example a permanent magnet, and the piston may comprise an inductive coil for generation of electrical energy in the coil by electromagnetic induction during movement of the piston in the housing. The inductive coil may for example be positioned in a piston rod. In this way the generation of electrical energy by electromagnetic induction contributes to the damping, and the harvested electrical energy can be used elsewhere. This may be especially advantageous on an offshore rig where the access to electricity may be limited. For example, it may be especially suitable for heave compensators used in well intervention operations where the heave compensated load, e.g. landing string with tools and riser strings, may have a known band of tension to keep within. These heave compensators may include crown-mounted and dead line compensators, as well as wireline and N-line riser tensioners. The level of energy harvesting can be adjusted with the tension variation performance, and in cases where inertial forces dominate, even help lower the tension variation.

In an exemplary embodiment, the magnetic fluid damping system may be an isolated unit for being connected to a prior art heave compensator. For example, the magnetic fluid damping system may be mounted in parallel to main cylinder actuators and attached to the same structures as those main cylinder actuators are. Such a parallel-mounted magnetic fluid damping system for use in drilling and well intervention may require additional control schemes for anti-recoil control as well as optimization for weight-on-bit variation compared to prior art magnetic fluid dampers. An advantage is that this solution can be added both to existing solutions as part of a retrofit upgrade, or as part of a new delivery.

In another disclosed exemplary embodiment, the damping system may be an integrated part of the heave compensator. For example, the magnetic fluid damping system may be in the form of a double-acting cylinder filled with magnetic fluid, wherein the cylinder housing and piston are attached to the separate structures which need vibration damping in relation to each other, for example an oil rig and a drill string. The vibrational motion of the separate structures thereby moves the piston relative to the cylinder housing of the magnetic fluid damper as described above, whereby the fluid is forced through the flow passage. The flow passage may for example be in the piston, such that the magnetic fluid flows between the rod and piston side chambers of the cylinder. Alternatively, the flow passage may be located in flow ports between the hydraulic cylinder and a tubing, or in a valve along the tubing. As long as movement of the piston in the cylinder housing causes the magnetic fluid to flow through the flow passage, the damping can be controlled by controlling the viscosity of the magnetic fluid at the flow port using an electromagnet.

The proposed configuration of the magnetic fluid damper in heave compensation systems are principally different than known methods. The heave compensator must maintain its load-holding and compensating properties, and thus its cylinder actuators typically cannot be directly converted to cylinder damping devices as described in the prior art. Instead, the magnetic fluid damping may be applied by magnetic fluid damping devices on either the inlet or outlet. In purely pneumatic heave compensators, the rod side chamber of the main cylinder actuators may be filled with magnetic fluid with an outlet to a magnetic fluid damper.

Additional advantages of using magnetic fluid damping systems offshore compared to known use includes management of released kinetic energy in sudden loss of load, integration of magnetic fluid damper device, and heave compensator for active control outside of mere vibration damping, such as weight-on-bit and lift-off control. Thus, the use of magnetic fluids in a heave compensator can enable features and functions previously not possible without adding additional complexity, weight, and cost, for example in the form of valves and active control circuits with pumps and actuators. Therefore, this technology can bring value to the heave compensator as it will not only be a more versatile system, but also cost-effective in comparison to its alternatives.

In a second aspect, this disclosure relates to a heave compensator comprising a damping system according to the first aspect of this disclosure, summarized above.

Some examples of possible uses of the damping system follow below.

The magnetic fluid damping system may be used to control the damping characteristic of a heave compensator. This can be useful in various drilling and well intervention operations with unprecedentedly low response times. The magnetic fluid damping system can provide anti-recoil control, for example in controlled string disconnection scenarios, uncontrolled string parting protection, as well as improved weight-on-bit variation performance, in one compact device. These utilities of the magnetic fluid damping system enable it to replace or complement the existing main speed control or flow shut-off valve. For alternative prior art solutions to achieve the same level of utility will require several add-ons that increase complexity, cost, and weight compared to the present solution which includes magnetic fluid.

The magnetic fluid damping system may also be used separately, purely as an emergency device, which is only to be activated to decelerate the remaining load after an uncontrolled string-parting incident, or to activate to reduce system instability in cases where the heave compensator inadvertently enters resonance with the rig heave motion.

The magnetic fluid damping system can alternatively be used as end stop dampers to prevent high-speed end stop impacts. This can often be problematic in erratic rig heave motion where the rods are close to the end stops of the main cylinder housings. This type of controllable damping will be superior to integrated dampers within the cylinders as integrated types are often of fixed design and may cause undesirably high pressure changes when the rods exit the damping zone. With the magnetic fluid damping systems' adjustable damping, such transitions between damping and no damping will be smooth and unproblematic. The cylinders' mechanical structures can also be simplified as a result.

Due to the high flexibility in controlling the damping characteristic, the magnetic fluid damping system can also be set up to specifically mitigate effects such as excessive inertia. In this role as an inertial damper, systems that are subject to high inertial forces such as compensators with high sheave system gearing ratios may be able to specifically counteract inertial effects without the need for an additional active heave compensator system which typically requires a separate high-pressure unit with lengthy pipelines, valve system, and its own linear or rotary actuator.

The application range of the magnetic fluid damping system may extend to all systems with cylinders or actuators that have demanding requirements for motion control while subject to complex motion dynamics. This holds especially true for motion compensation systems like the drilling and well intervention heave compensator where performance and safety are paramount and tightly related.

In a third aspect, this disclosure relates to a method for controlling the damping of a heave compensator, wherein the method comprises the step of subjecting a magnetic fluid to a magnetic field at a flow passage for restricting the flow of the magnetic fluid. By controlling the magnetic field, the viscosity of the magnetic fluid can be controlled, thereby controlling the damping. The method may additionally comprise the step of monitoring the movement of a load on the heave compensator. Such a feedback will allow for optimal damping of the damping system for the specific situation. The method may additionally comprise the step of generating electrical energy by electromagnetic induction during damping of the heave compensator.

BRIEF DESCRIPTION OF DRAWINGS

In the following is described exemplary embodiments illustrated in the accompanying drawings, wherein.

DETAILED DESCRIPTION OF THE DISCLOSED EXEMPLARY EMBODIMENTS

Figure 1:
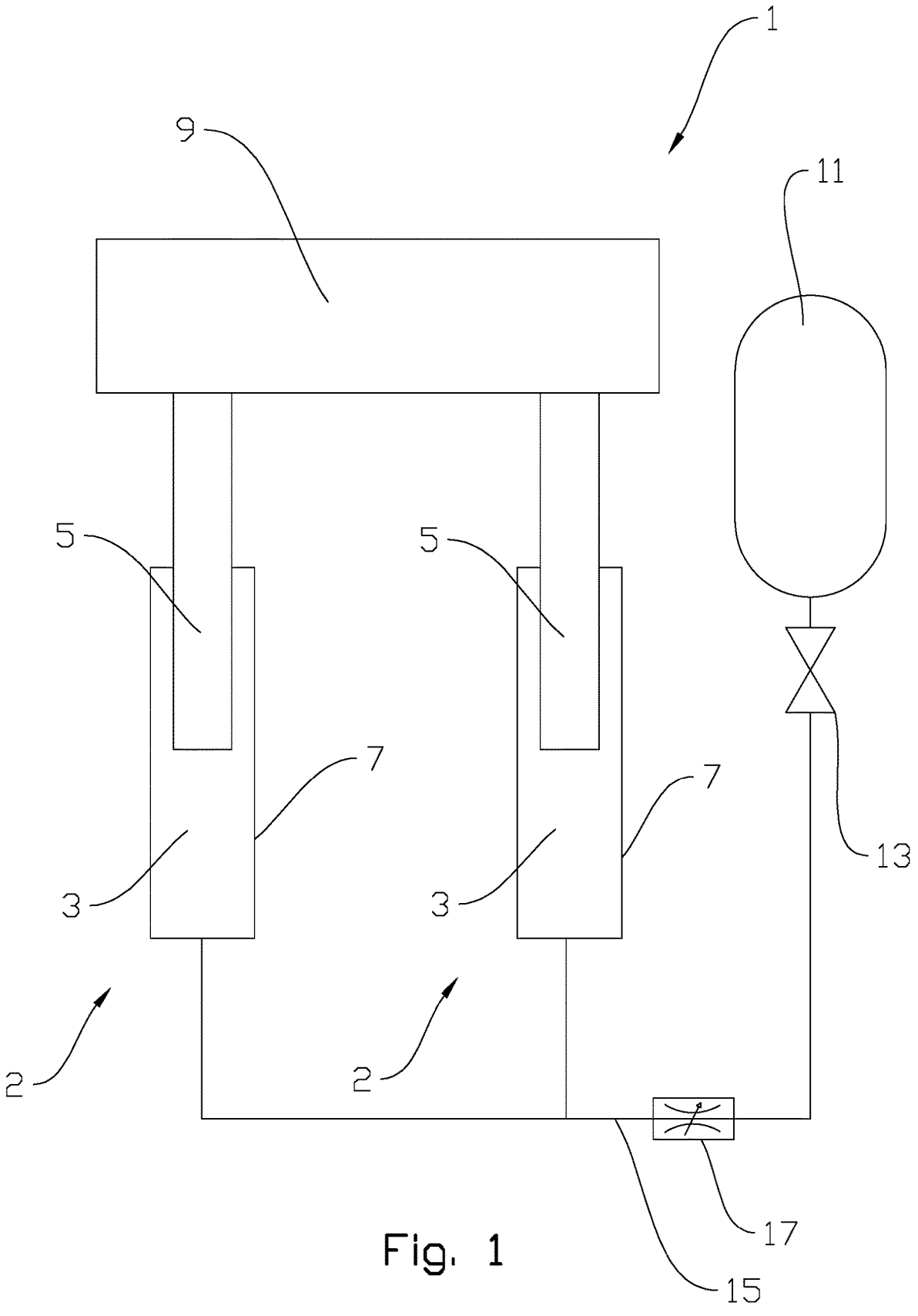
FIG. 1 shows a heave compensator comprising an integrated damping system according to this disclosure.

In the drawings, the reference numeral 1 indicates a heave compensator comprising a damping system according to this disclosure. Identical reference numerals indicate identical or similar features. The drawings are presented in a simplified and schematic manner, and the features therein are not necessarily drawn to scale.

FIG. 1 shows a schematic drawing of a heave compensator 1 with a damping system according to this disclosure. The heave compensator 1 comprises two plunger type hydraulic cylinders 2, each comprising a piston rod 5 in a cylinder housing 7. The hydraulic cylinders 2 may also be of another type. The rods 5 are attached to a load 9 which movement is to be damped, while the housings 7 are attached to a main structure (not shown), for example an offshore oil rig. The cylinders 2 are filled with a magnetic fluid 3 functioning as a hydraulic fluid. The fluid is in fluid communication with an accumulation tank 11 via a flow path 15 and an isolation valve 13. The damping system comprises a valve 17 functioning as a flow passage for restricting the flow of the magnetic fluid 3 during the movement of the rod 5 in the cylinder housing 7. The valve 17 comprises an electromagnet (not visible), which can provide a magnetic field at the flow passage. The amplitude of the magnetic field, and thereby the viscosity of the magnetic fluid 3 at the valve 17, can be controlled via a magnetic fluid management system (not shown). If the viscosity of the magnetic fluid 3 at the valve 17 is increased, the flow of said magnetic fluid 3 through the valve 17 is restricted further, thus increasing the damping effect of the hydraulic cylinders 2 and the heave compensator 1. The valve 17 can be placed elsewhere, but the position along the main flow path 15 ensures equal distribution of the damping to the individual hydraulic cylinders 2.

Figure 2:
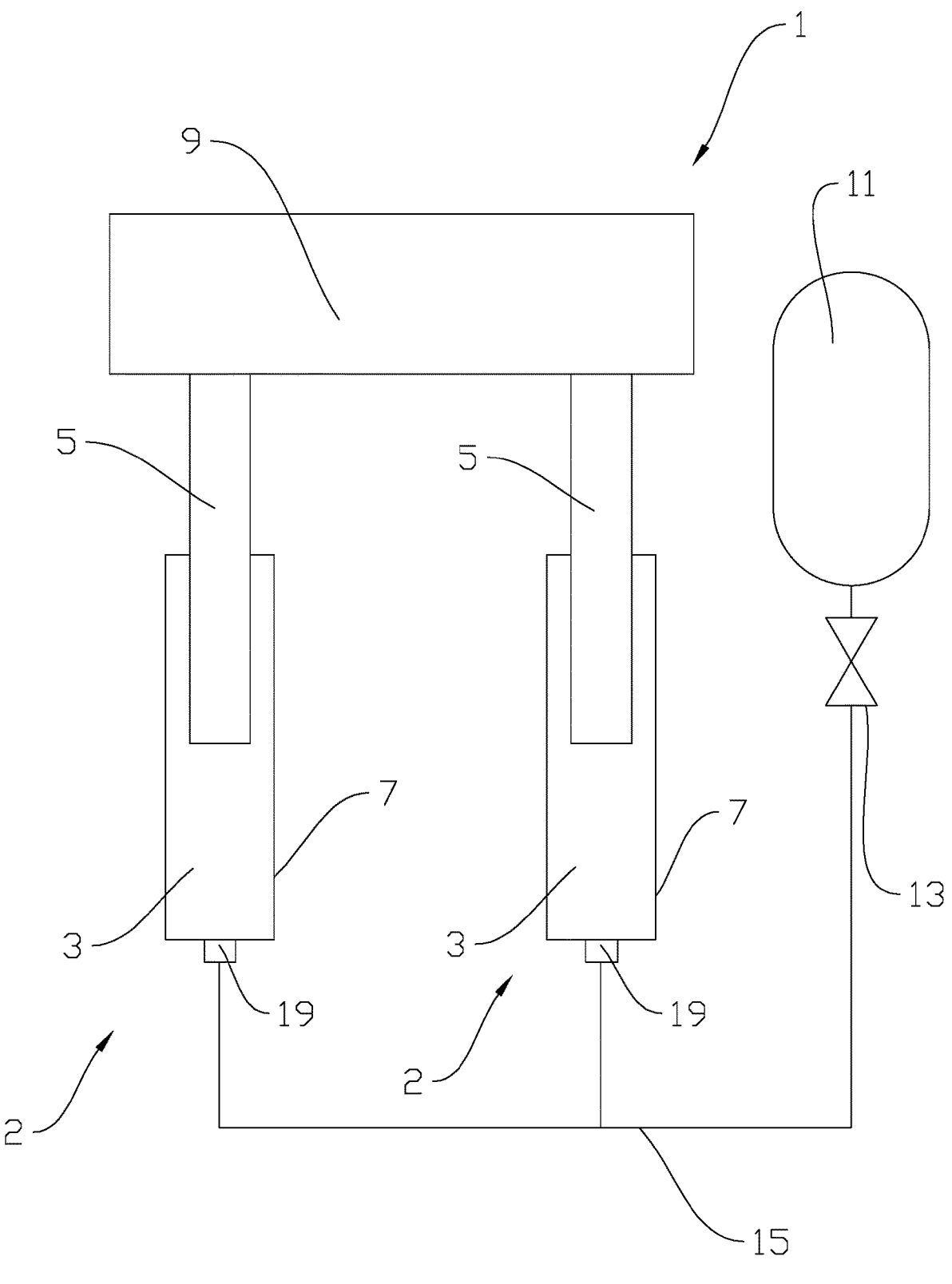
FIG. 2 shows a heave compensator comprising another integrated damping system according to this disclosure.

FIG. 2 shows a similar heave compensator 1 as in FIG. 1, but in the embodiment shown in FIG. 2 the damping system comprises a port 19 on each hydraulic cylinder 2, where the ports 19 function as flow passages. The ports 19 comprises electromagnets (not visible) for providing a magnetic field. The magnitude of the electric field may be controlled by a magnetic fluid management system (not shown), thereby controlling the damping of the damping system.

Figure 3:
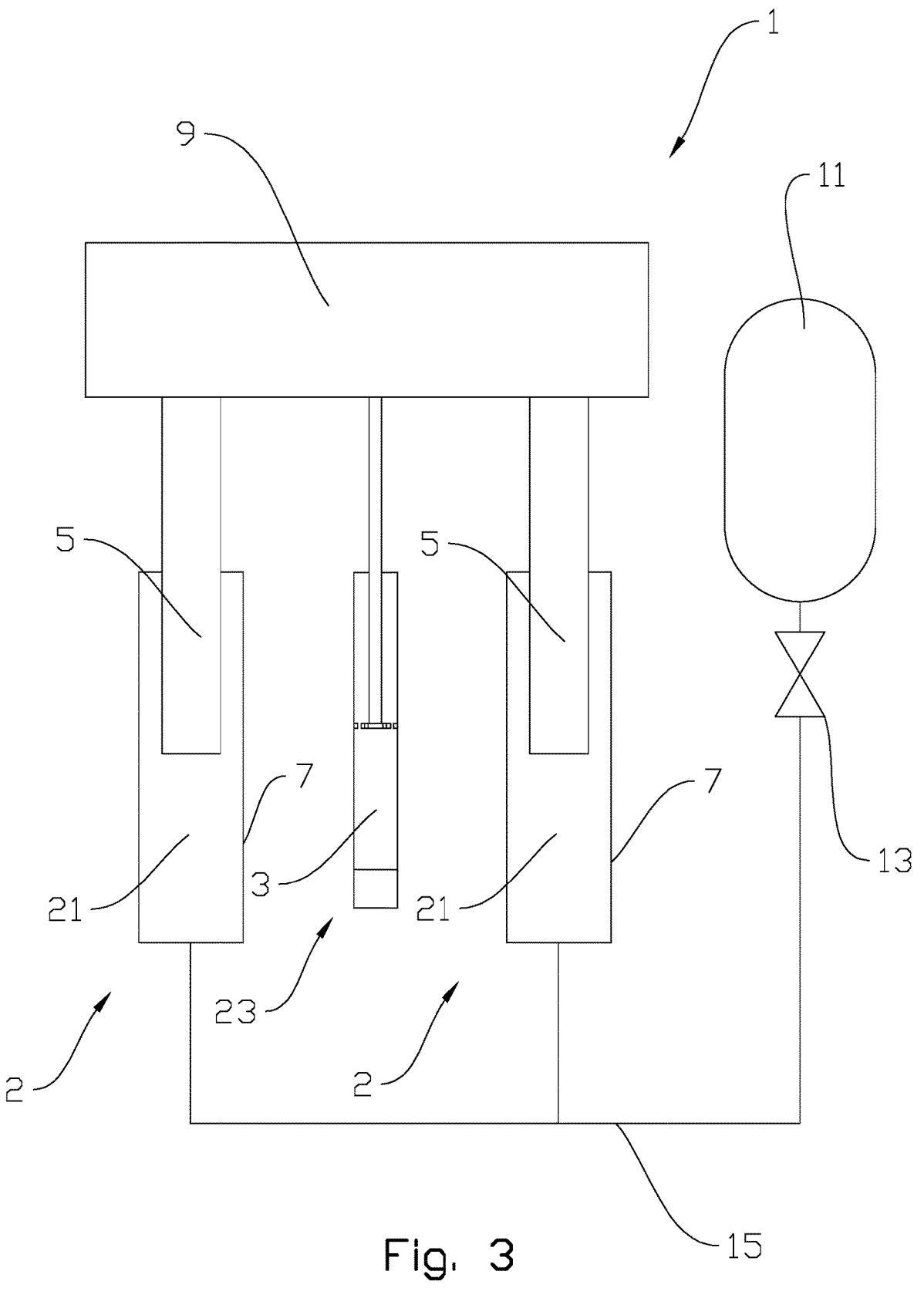
FIG. 3 shows a heave compensator comprising a separate damping system according to this disclosure.
Figure 4:
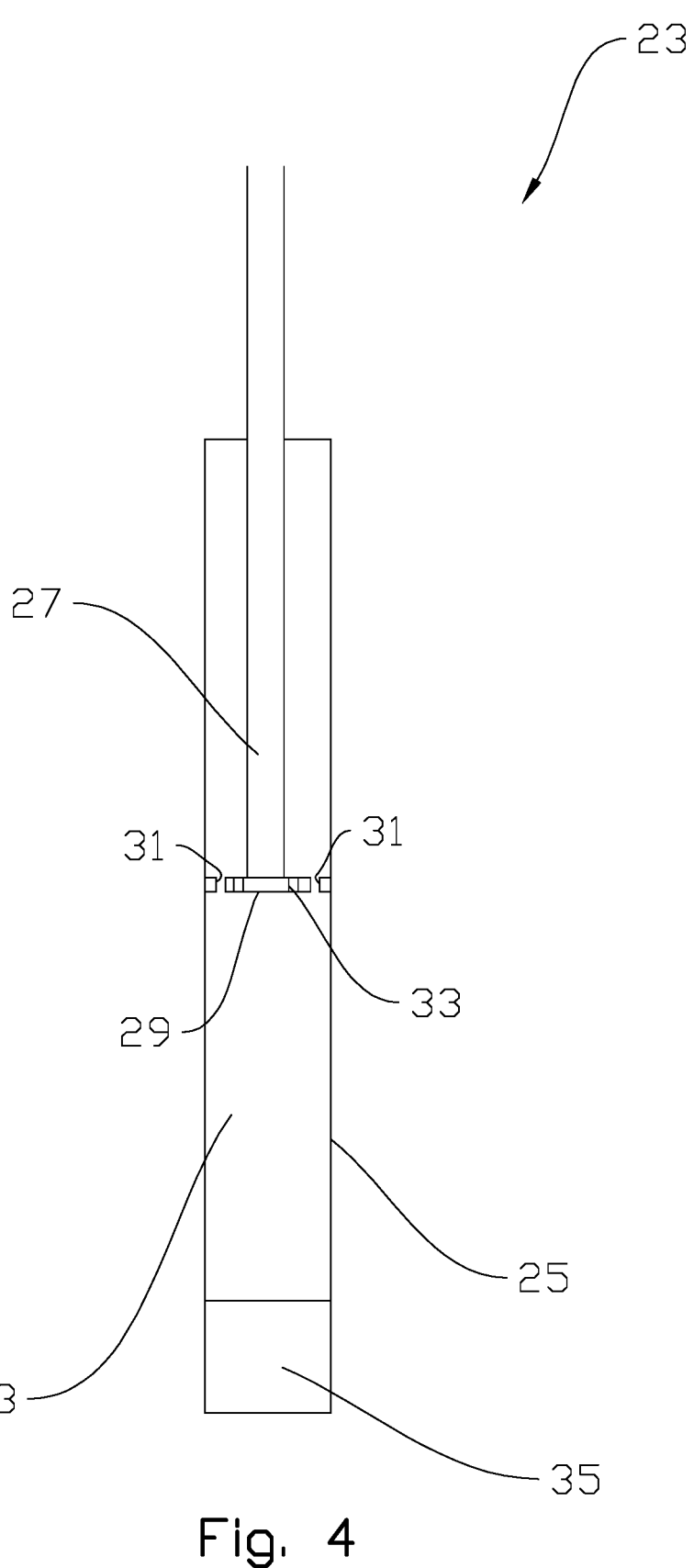
FIG. 4 shows in a larger scale the separate damping system of FIG. 3.

FIG. 3 shows a heave compensator 1 similar to the ones in FIGS. 1 and 2, however, in the embodiment shown in FIG. 3 the magnetic fluid damping system comprises a separate hydraulic cylinder 23 added to a prior art heave compensator 1. The magnetic fluid hydraulic cylinder 23 comprises magnetic fluid 3 while the main hydraulic cylinders 2 comprises a standard hydraulic fluid 21. Details of the magnetic fluid hydraulic cylinder 23 are shown in FIG. 4. This embodiment of the disclosure has the advantage that it may be added to existing heave compensators 1 for improved damping and additional features as described above.

FIG. 4 shows in a larger scale the magnetic fluid hydraulic cylinder 23 from FIG. 3. The hydraulic cylinder 23 comprises a cylinder housing 25 and a piston rod 27 with a piston 29. The piston 20 has openings 31 which functions as flow passages for restricting the flow of the magnetic fluid 3 through the openings 31 in the piston 29 when the rod 27 and piston 29 are axially displaced in the cylinder housing 25. The piston also comprises an electromagnetic coil 33 for subjecting the magnetic fluid 3 at the openings 31 to a magnetic field. The magnitude of the magnetic field may be controlled using a magnetic fluid management system (not shown), and the electromagnetic coil 33 can be connected to said magnetic fluid management system via a cable in the piston (also not shown). The magnetic fluid hydraulic cylinder 23 comprises a gas chamber 35 having a variable volume and comprising a compressible gas. The volume of the gas chamber 35 changes when the piston 29 and rod 27 moves within the cylinder housing 25, since less volume is available for the magnetic fluid 3 in the rod side of the cylinder 23 than on the piston side due to the volume of the rod 27.

Figure 5:
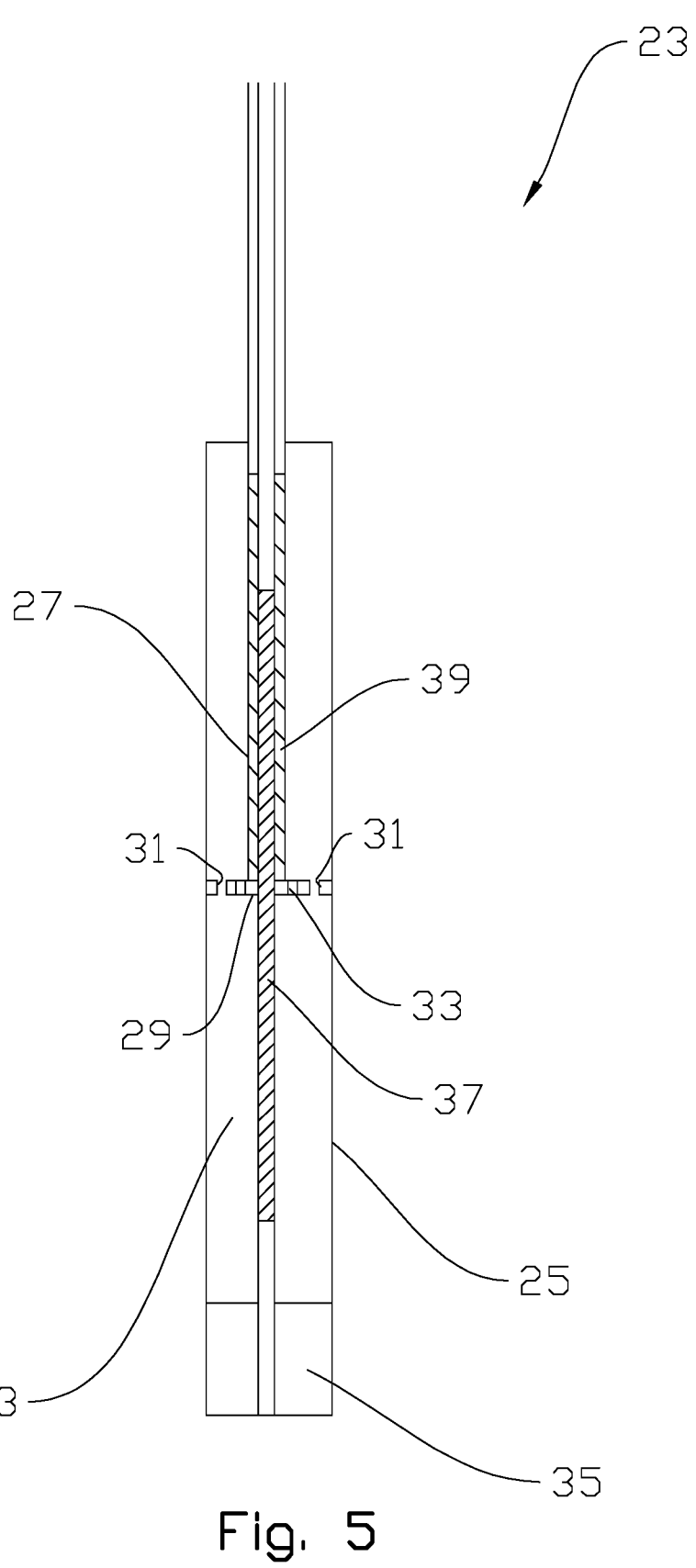
FIG. 5 shows a hydraulic cylinder which can be used for harvesting electrical energy.

FIG. 5 shows a magnetic fluid hydraulic cylinder 23 which can be used for harvesting electrical energy. The shown embodiment is the same type as in FIG. 4, but the principle may be used for other types of cylinders as well, and for hydraulic cylinders with hydraulic fluids which are not magnetic fluids. In addition to the features shown in FIG. 4, the cylinder 23 comprises a central permanent magnet 37 connected to the cylinder housing 25 and a coaxial inductive coil 39 located in the piston rod 27. Movement of the piston rod 27 in the cylinder housing 25 will thus have the effect of a relative movement of the permanent magnet 37 through the inducing coil 39, whereby electrical energy is induced in said coil 39.

Figure 6:
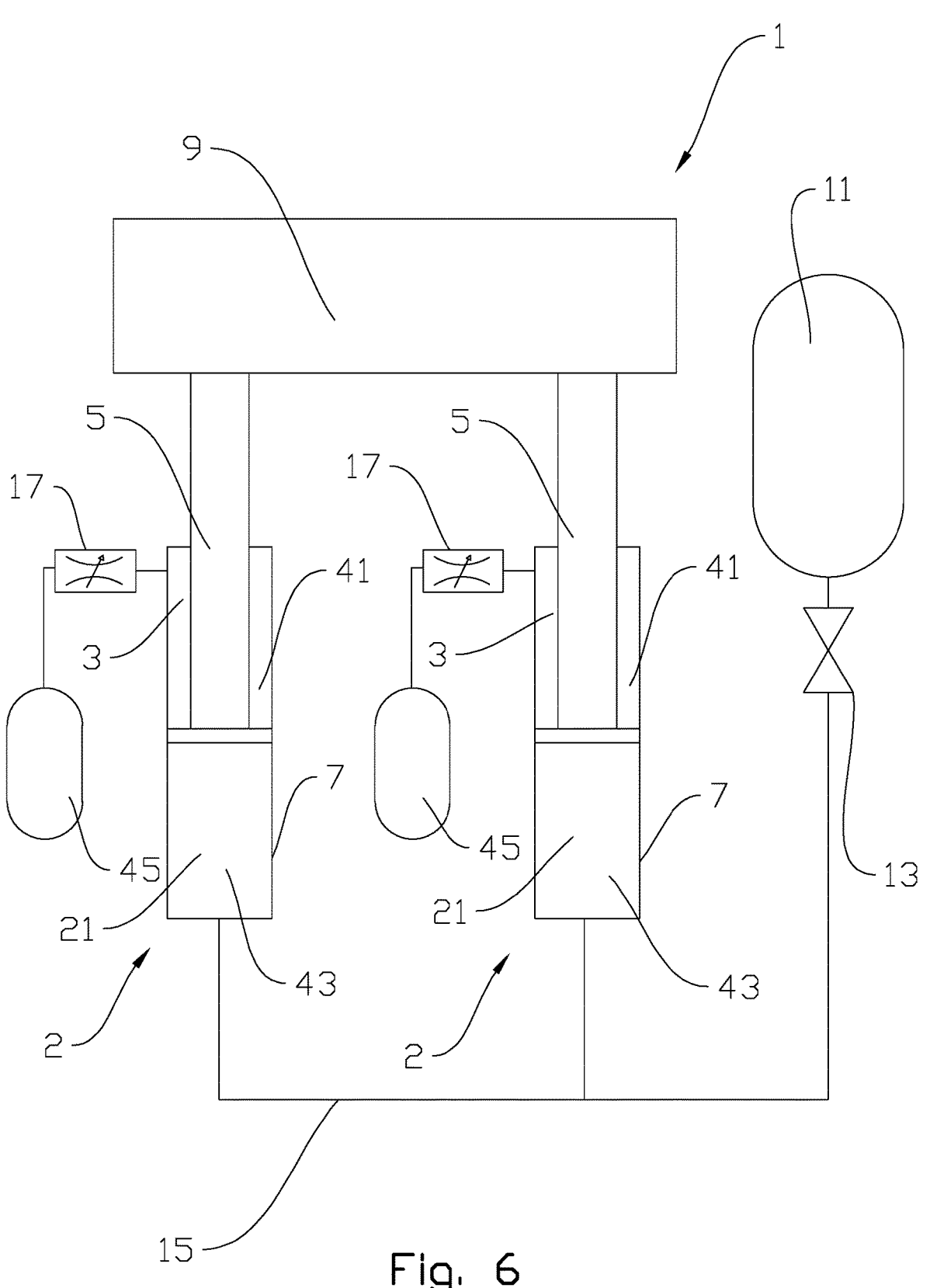
FIG. 6 shows a heave compensator comprising yet another damping system according to this disclosure.

FIG. 6 shows another exemplary embodiment of a heave compensator 1 comprising a magnetic fluid damping system according to this disclosure. In this embodiment, the heave compensator 1 comprises two hydraulic cylinders 2 which are differential cylinders that have a low-pressure side on the rod side 41. The rod side 41 comprises magnetic fluid 3, while the piston side 43 may comprise regular hydraulic fluid 21 for cost-saving. The magnetic fluid 3 on the rod side 41 of each cylinder 2 is connected to a magnetic fluid accumulator 45, and a valve 17 comprising an electromagnet (not shown) functions as a flow passage between the accumulator 45 and the rod side 41 of the cylinder 2. The degree of damping can be controlled by subjecting the magnetic fluid 3 to a magnetic field at the valve 17.

Figure 7:
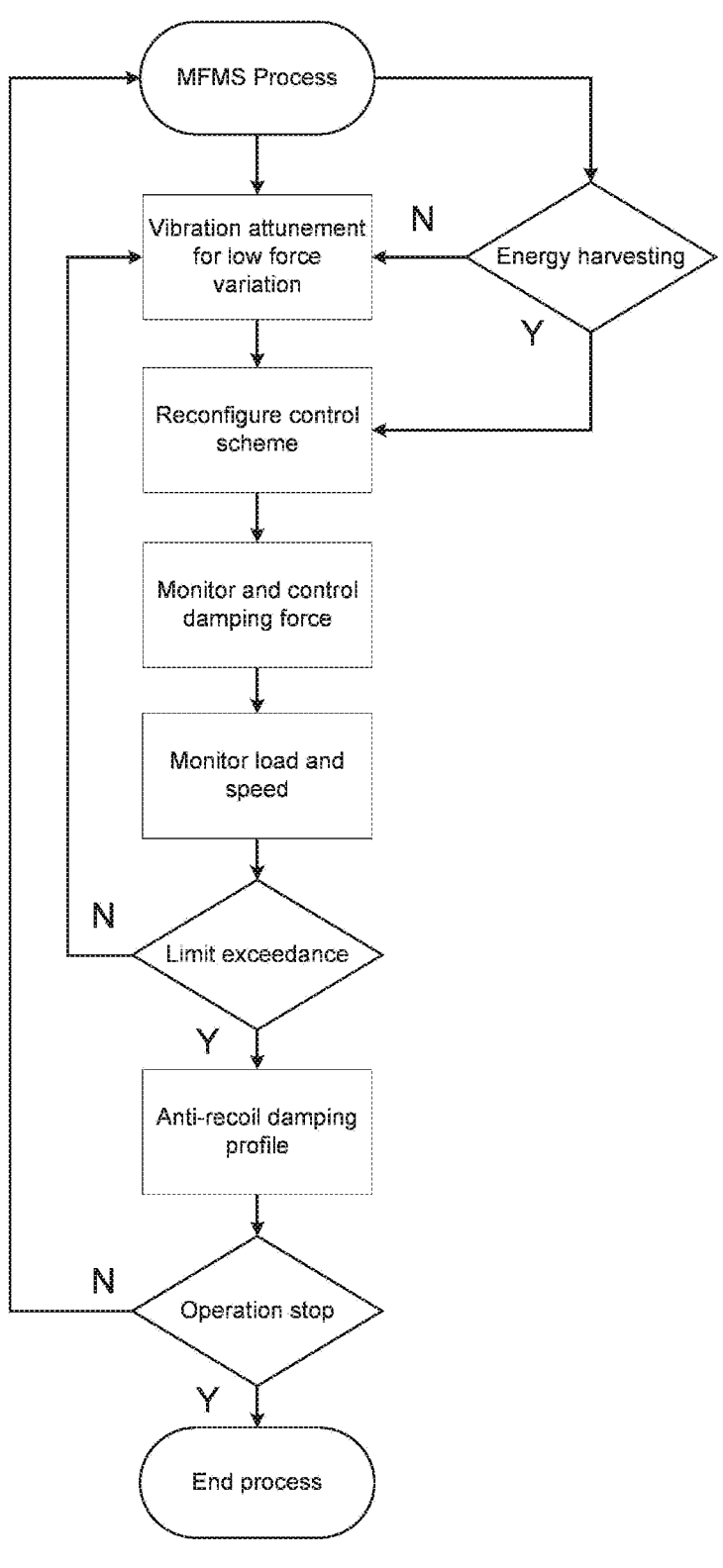
FIG. 7 shows a flow chart demonstrating the overall control scheme of one exemplary embodiment of a magnetic fluid management system (MFMS)

FIG. 7 shows a flow chart demonstrating the overall control scheme of one exemplary embodiment of a magnetic fluid management system (MFMS). The MFMS may be interfaced with the heave compensator control system for optimal performance of the total system. The MFMS process may include a possibility of energy harvesting as described above.

If the process does not have energy harvesting, or if a decision is taken not to use this feature, the first step of the MFMS process is to start vibration attunement for low force variation. Initiation of the MFMS process may require equipment power up before participation in the heave compensation operation, possibly involving controllers, electrical interfaces, and HMI (Human-Machine Interface) being online and in stand-by mode ready for operation. The process which follows is the automatic mode where preset vibration attunement algorithms for low force variation are run. This may involve a certain input voltage setting being applied to the electromagnetic coils with a specific characteristic vs the velocity and position of the piston in order to minimize variation of force which is beneficial for a desired process, e.g. the drill bit during drilling. Damping will be lower with higher piston velocity, with damping also increasing near the cylinder end stops. If energy harvesting is activated, the device or circuit will go into a configuration in which the induced voltage is supplied back to the control circuit for powering it or to an energy storage system.

The next step is to reconfigure the control scheme, where the software will check for any changes to the control scheme based on input from user. This can be the activation of energy harvesting or changes to parameters of the automatic mode. The damping force will be monitored and controlled to keep it within acceptable limits in terms of force variation to protect the payload from excessive damping forces. The load and speed is monitored, and if it is within a prescribed limit, the process returns to the vibration attunement step for low force variation and repeats the following steps. On the contrary, if the limit is exceeded, e.g. due to a loss-of-load, the damping is altered to an anti-recoil damping profile to avoid high kinetic energy of the load. The damping force will be increased according to the recoil acceleration in an attempt to decelerate the recoiling load as much as possible. A decision is thereafter taken on whether to stop the process or restart it from the beginning. For system shutdown, e.g. when the drilling operation is over, the active circuits are deactivated.

Figure 8:
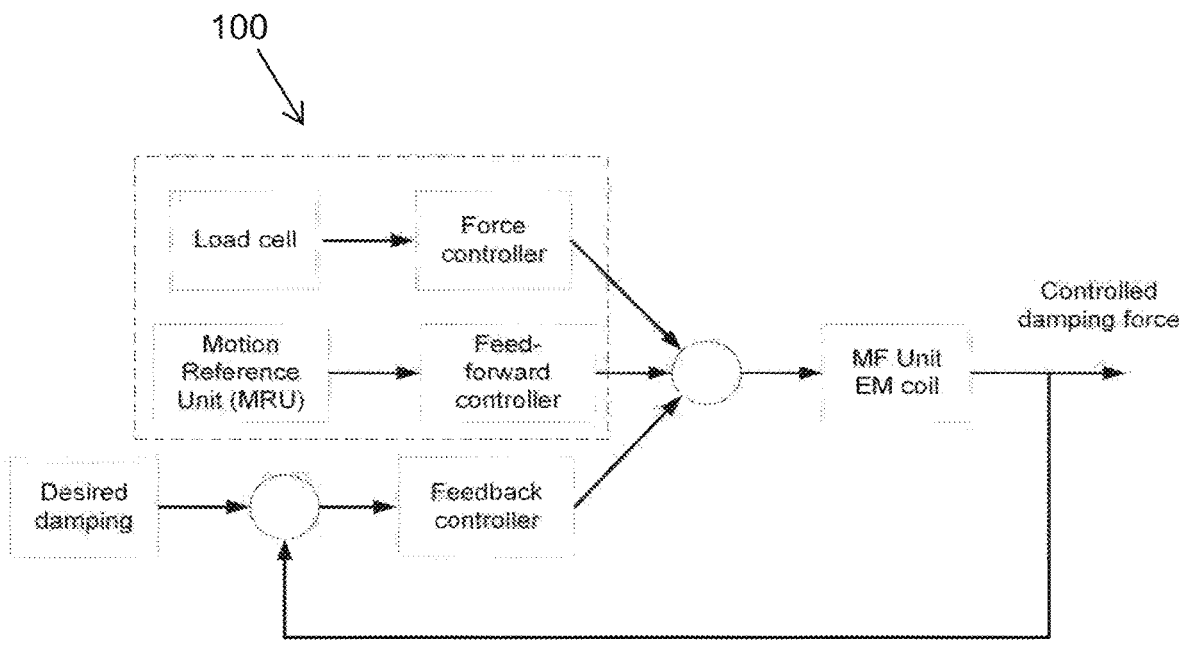
FIG. 8 shows a control system block diagram for a magnetic fluid cylinder, valve, and/or port.

FIG. 8 shows a block diagram of a magnetic fluid management system 100 for a magnetic fluid cylinder, valve, and/or port. This is a simplified, but representative magnetic fluid management system 100 for controlling the MF devices in relation to vibration attunement. The magnetic fluid management system 100 can be considered a lower-level control scheme that covers the steps of "vibration attunement for low tension variation" and "anti-recoil damping profile" from FIG. 7. The desired damping is derived from the heave compensator's force characteristics, which may change depending on compensator stroke and speed. There will be additional control schemes for end stop damping.

The load cell measures the tension below the hoisting wire ropes, thus giving an indication of the payload wet weight, e.g. of a submerged drill string. This signal goes to a programmable logic controller 50 which processes it according to a force control algorithm, e.g. a P, PI, PD or PID (where P is an abbreviation for proportional, I is an abbreviation for integral, and D is an abbreviation for derivative) feedback control system which outputs an adjustment signal based on deviation from a reference tension setting. The engagement of this mode, as well as its standard settings, will be dependent on the overall heave compensation system mode. For example, if the overall system is in drilling mode, the force controller will be the dominant contributor to the control signal with specific tuning parameters favourable for drilling.

The motion reference unit is an inertial measurement unit for sensing linear and rotational accelerations, which are then processed to give velocity and displacement values. The MRU feeds the displacement and velocity values to a programmable logic controller, e.g. as the one which processes load cell signal, and the values are then processed as part of a feed forward control circuit. This circuit will be tuneable through adjustment of the feedforward gain among other parameters. The engagement of this mode, as well as its standard settings, will be dependent on the overall heave compensation system mode. For example, if the overall system is in recoil or lift-off modes, the feed forward controller will be the dominant contributor to the control signal with specific tuning parameters favourable for these scenarios.

The reference signal for desired damping will have a standard value but can be adjusted by user input. This reference signal will be used as part of a feedback control loop together with the computed damping force output from the MF device.

The MF unit/EM coil represents the unit itself, i.e. the magnetic fluid cylinder, valve, or port, which takes a voltage input signal and outputs a change in magnetic field which will then affect fluid damping.

It should be noted that the above-mentioned exemplary embodiments illustrate rather than limit the invention, the invention being defined by the claims set out below, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps which are not stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A method for controlling the damping of a heave compensator, wherein the method comprises:
   moving a piston of a hydraulic cylinder in a housing of the hydraulic cylinder to damp relative motion between a first structure coupled to the piston and a second structure coupled to the housing, wherein the housing comprises a permanent magnet disposed in an interior of the housing, and the piston comprises an inductive coil disposed in the interior of the housing and which is inductively coupled with and moves relative to the magnet in response to the movement of the piston in the housing;
   placing a magnetic fluid management system (MFMS) of the heave compensator in an energy harvesting mode;
   generating electrical energy in the inductive coil by electromagnetic induction in response to the relative movement of the inductive coil and the magnet in the housing with the MFMS in the energy harvesting mode;

reconfiguring the MFMS from the energy harvesting mode to a separate damping mode such that a flow of electrical energy to an electromagnetic coil in the piston in is provided; and subjecting the hydraulic magnetic fluid in fluid communication with the hydraulic cylinder to a magnetic field at a flow passage for restricting the flow of the magnetic fluid and to adjust the damping between the first structure and the second structure in response to altering the viscosity of the hydraulic magnetic fluid by supplying the electromagnetic coil with electrical energy with the MFMS in the damping mode.

2. The method according to claim 1, further comprising monitoring movement of a load on the heave compensator.

3. The method according to claim 1, further comprising generating electrical energy by electromagnetic induction during damping of the heave compensator.

4. The method according to claim 1, further comprising:

tuning a programmable logic controller by selecting a heave compensation system mode selected from the group consisting of a recoil mode, a lift-off mode, and a drilling mode;

measuring a payload weight of a submerged drill string;

measuring at least one of velocity and displacement of an off-shore rig, the hydraulic cylinder being coupled between the off-shore rig and the drill string; and changing the viscosity of the magnetic fluid with the programmable logic controller based on the heave compensation system mode, the payload weight, and the at least one of velocity and displacement of the off-shore rig.

5. The method according to claim 1, wherein the magnet is coupled to the housing such that relative movement between the magnet and the housing is restricted.

\* \* \* \* \*